United States Patent Office 2,908,478
Patented Oct. 13, 1959

2,908,478

MOTOR VALVE

Delbert Starrett, Bartlesville, Okla., assignor to Phillips Petroleum Company, a corporation of Delaware Application November 23, 1955, Serial No. 548,623

4 Claims. (Cl. 251—58)

This invention relates to motor valves. In one aspect it relates to a diaphragm motor valve in which substantial movement of the motor mechanism causes only a relatively small movement of the valve. In another aspect it relates to a motor valve in which movement of the motor mechanism is transmitted by a leverage mechanism to an adjustable valve.

In the past, many attempts have been made to use motor valves for regulating or maintaining flow rates of liquid or gas within very narrow limits. Experience has shown, however, that it is very difficult to accurately and rapidly adjust the position of the valve relative to widely varying flows and high upstream pressures. Moreover, while the position of the valves of some of the motor valves used heretofore may be adjusted relative to the motor mechanism, the degree of adjustability of these motor valves while the valve is "on stream" has been limited. Thus, there has arisen a need for a motor valve having a valve which may be readily and accurately adjusted through small increments while "on stream" from a fully open to a fully closed position.

Accordingly, it is an object of this invention to provide a motor valve capable of maintaining a large pressure drop within very narrow limits.

Another object is to provide a motor valve which may be easily and rapidly adjusted while on stream to change the pressure drop an exceedingly small degree.

A further object is to provide a diaphragm motor control valve having a widely varying degree of adjustability between a fully open and fully closed position.

Numerous other objects and advantages will be apparent to those skilled in the art from the accompanying specification, appended claims, and drawings, in which:

Broadly contemplated I proposed to provide a motor valve comprising a motor mechanism adapted to control a needle-type valve mechanism within very close limits. The movement of the diaphragm in the motor valve is adapted to transmit and control the movement of a needle-type control valve through a leverage mechanism. Movement of the diaphragm over a considerable distance is adapted to cause the valve needle to be moved only a very small distance. A locking arrangement is also provided so that the valve can be opened manually to approximately the desired position, and the control mechanism then locked by a valve handwheel. With the motor valve thus provided, considerable improved control of the valve needle is obtained.

Figure 1:
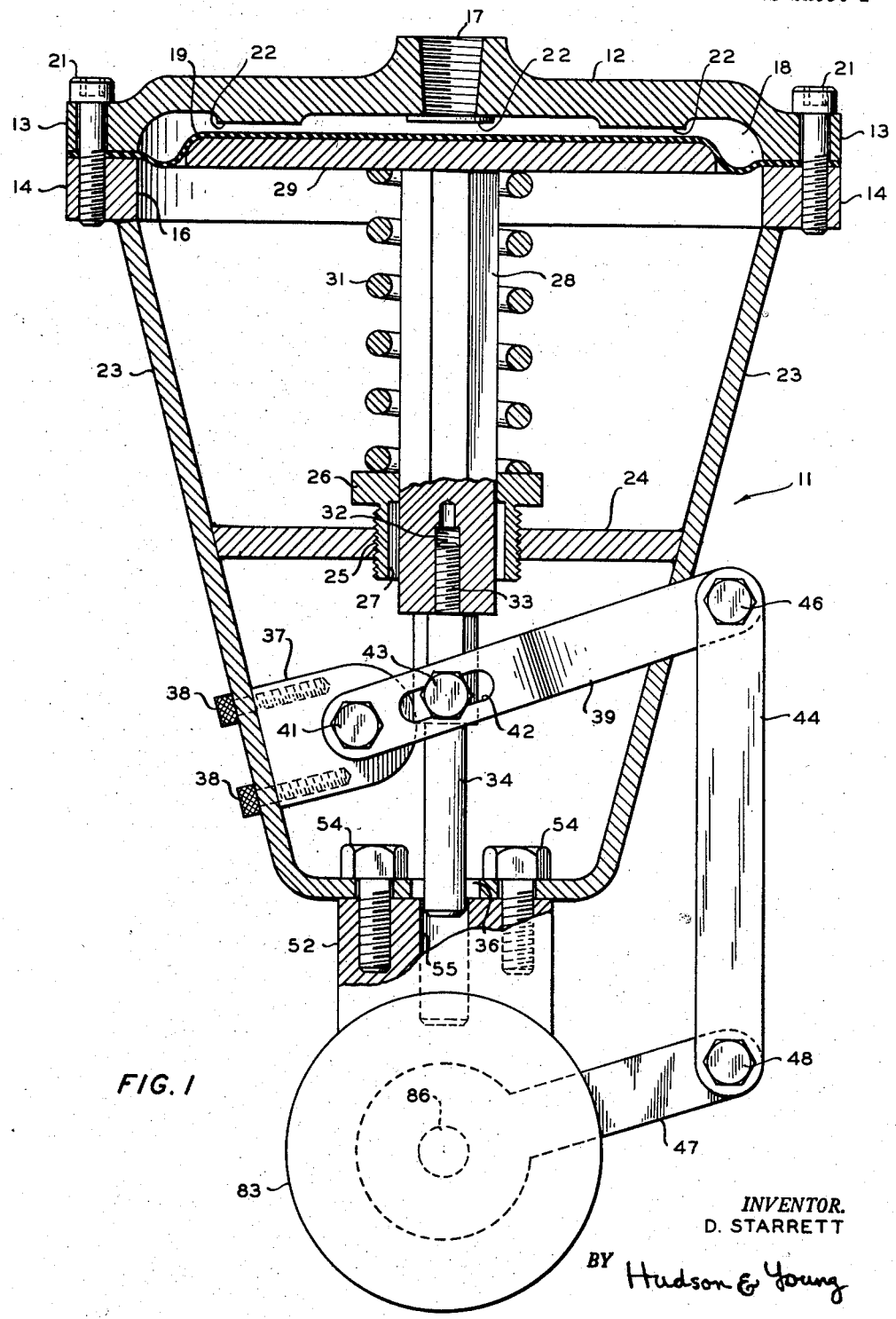
Figure 1 is a cross-section elevational view of a motor valve embodying the present invention.

Referring to the drawings now in which like reference numerals have been used to designate like parts, and to Figure 1 in particular, a diaphragm motor mechanism generally designated as 11, comprises an upper diaphragm casing 12 having a peripheral flange 13 rigidly secured to the peripheral flange 14 of a lower diaphragm housing 16. Upper diaphragm casing 12 is provided with conduit means 17 for supplying pressure fluid (not shown) to chamber 18 which is defined by the inner wall of upper diaphragm casing 12 and a flexible diaphragm 19 which extends across the inside of the diaphragm housing provided by diaphragm casings 12 and 16 and is preferably secured to flanges 13 and 14 at its peripheral edge by means of bolts 21 or the like. The inside wall of upper diaphragm casing 12 is provided with downward projecting bosses 22 to prevent the diaphragm 19 from contacting upper diaphragm casing 12. Diaphragm 19 may be made of rubber or any flexible material preferably resistant to the attack of pressure fluid entering conduit 17 and chamber 18.

A yoke having arms 23 is secured to lower diaphragm housing 14 by any suitable means such as welding, and transverse rib 24 is mounted between the arms 23. The central portion of rib 24 is provided with a screw threaded aperture 25 in which a bushing 26 is threaded. Passing through an aperture 27 in bushing 26 is a stem 28 attached to a diaphragm follower plate 29 which is in turn disposed adjacent the under-side surface of diaphragm 19, said stem 28 and plate 29 comprising a driven mechanism. A spring 31 surrounds stem 28 and is retained at one end by bushing 26 and abuts at its other end the lower surface of diaphragm follower plate 29 urging the same against said diaphragm 19. Said spring 31 is preferably a helical compression spring as shown disposed axially of the threaded aperture 25. The tension of spring 31 can be adjusted by screwing bushing 26 in or out of aperture 25 to the desired extent. Stem 28 may be attached at one of its ends to diaphragm follower plate 29 by any suitable means such as welding. The aperture 27 in bushing 26 is adapted to reduce friction by closely fitting the edges of the polygonal surfaces of stem 28.

Stem 28 is provided with a central threaded aperture 32 for receiving the threaded end 33 of a lever coupling stem 34 which may be allowed to pass through an aperture 36 provided in the lower portion of yoke arms 23. Fulcrum bracket 37 is attached to the interior of a yoke arm 23 by means of bolts 38. A first lever actuating arm 39 is attached to fulcrum bracket 37 by means of bolt 41. Actuating arm 39 is provided with an opening 42 adjacent coupling stem 34 and arm 39 is retained thereto by bolt 43; the position of which is permitted to freely change in opening 42 in response to the reciprocation of coupling stem 34. Actuating arm 39 is deformed at approximately its center in order that the end opposite the fulcrum bracket 37 may extend to the exterior of yoke arms 23. Actuating arm 39 is secured to one end of linkage arm or pitman 44 by means of bolt 46; the other end of linkage arm 44 is threadedly secured to a second lever actuating arm or drive member 47 by means of bolt 48. Adjustability of the leverage mechanism may be accomplished to some degree by providing a plurality of threaded openings in drive member 47, these openings extending in a line back from the outer extremity of the drive member, so that bolt 48 can be threadedly secured through any of these openings, thereby changing the length of the path of travel through which drive member 47 moves.

Figure 2:
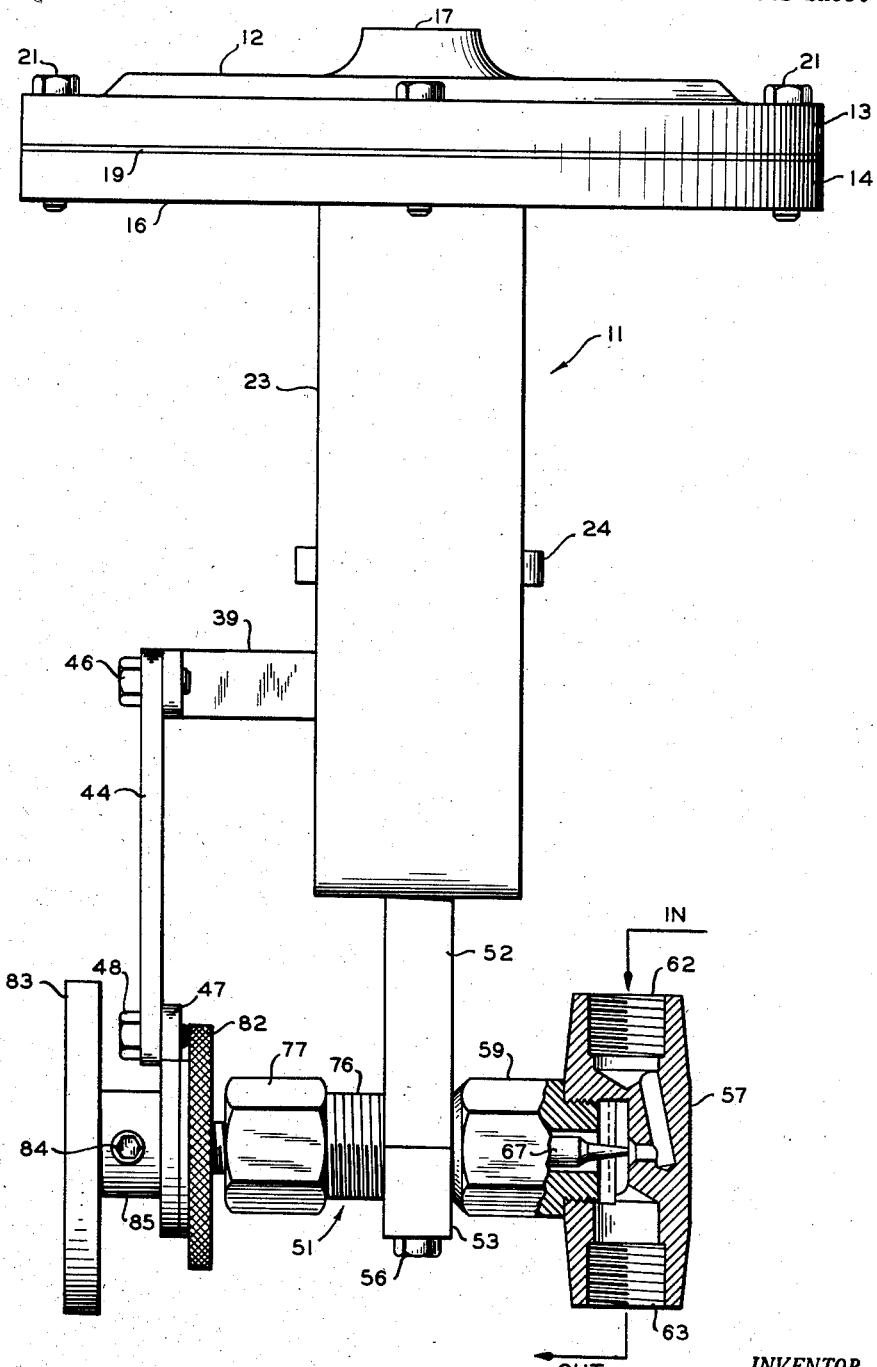
Figure 2 is a side elevational view of Figure 1.

Motor housing 11 is attached at its lower end to valve mechanism 51, Figure 2, by means of valve clamp base 52 and valve clamp cap 53. Valve clamp base 52 is rigidly secured to the lower portion of yoke arms 23 by bolts 54 and valve clamp cap 53 is secured to valve clamp base 52 by bolt 56. Valve clamp base 52 is provided with a passage 55 in communication with aperture 36 so as to receive the reciprocating coupling stem 34.

Figure 3:
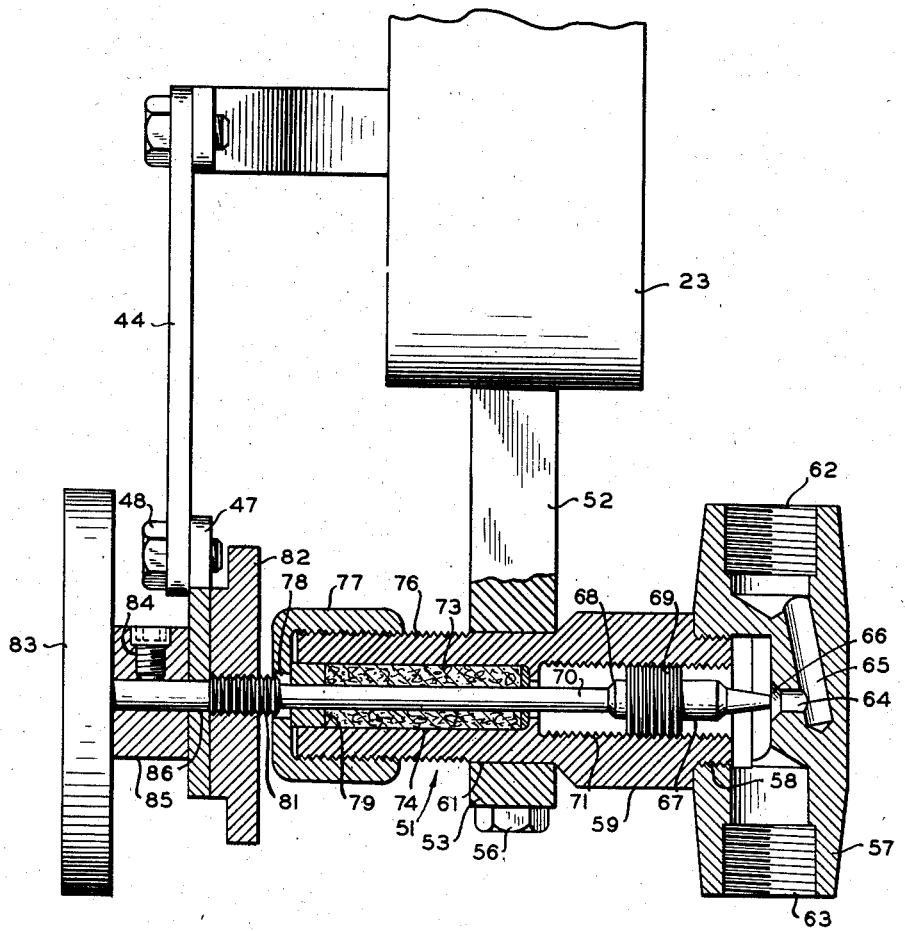
Figure 3 is a cross-section view in detail of the valve mechanism shown in Figures 1 and 2.

Referring now to Figure 3, the valve mechanism shown in detail comprises a valve body 57 which is connected by a threaded aperture 58 to a stem housing 59 which passes through an opening 61 provided by valve clamp base 52 and valve clamp cup 53. Valve body 57 is provided with suitable means 62 and 63 for connection to pipes (not shown); either one of said means may be an inlet and the other an outlet. Means 62 and 63 are in communication with a conduit means formed by the intersection of drilled passages 64 and 65. A valve seat 66 is provided in conduit 64 and a valve plug 67 is disposed to move to and from valve seat 66 for controlling flow of fluid therethrough. Stem housing 59 is provided with a central passage and disposed therein is valve stem or valve operating member 70. Enlarged portion 68 of valve stem 70 is provided with threads 69 adapted to be screwed within the inner threaded portion 71 of stem housing 59. Packing 73 provides a seal for central passage 74. The exterior of stem housing 59 is provided at one end with external screw threads 76 which are adapted to receive nut 77 having central opening 78. Adjustment of nut 77 provides adjustment of packing gland 79. The exterior portion 81 of valve stem 70 is provided with threads and is readily secured thereby to leverage adjustment nut 82. Handwheel 83 provided with sleeve 85 is secured to the end of valve stem 70 by a set screw 84. The enlarged portion of arm 47 is rigidly secured to valve stem 70 by reason of the friction contact of sleeve 85 and nut 82 therewith.

OPERATION

In Figure 1, diaphragm 19 is shown in its unoperated position. When sufficient fluid pressure is supplied through conduit 17 into chamber 18, diaphragm 19 moves downward in response thereto overcoming the force of spring 31 and diaphragm follower plate 29; stem 28 and coupling stem 34 correspondingly move downward also. Coupling stem 34 forces first actuating arm 39 to move which in turn causes second actuating arm 47 to move downward and rotate. The movement of diaphragm 19 is thus transmitted by means of members 39, 44 and 47 to the valve stem 70 which is rigidly secured to the second lever actuating arm 47 due to the frictional force exerted by the adjustment nut 82. Accordingly, valve stem 70 rotates and valve plug 67 moves toward valve seat 66 controlling fluid passage through the valve body 57. When a substantial deficiency in fluid pressure in chamber 18 occurs, diaphragm 19 in response thereto moves upward toward depending bosses 22, said movement augmented by the tension of spring 31. Stem 28, coupling stem 34, and members 39, 44, and 47 correspondingly move toward their initial positions. It is thus seen that the valve plug 67 can occupy intermediate positions with corresponding more or less throttling effects on the flow of fluid through conduits 64 and 65. The tension of spring 31 and the degree of movement of the members 39, 44 and 47 may be adjusted as desired.

When it is desired to adjust the rate of flow of fluid through valve body 57, that is, to change the pressure drop across valve body 57, adjustment nut 82 is loosened and handwheel 83 is turned manually causing valve plug to move either toward or away from valve seat 66. Valve stem 70, which is secured to handwheel 83 by set screw 84, may be rotated by the turning of handwheel 83 until the desired flow is obtained. Adjustment nut 82 is then tightened so that valve stem 70 may again move in response to the motor mechanism and leverage mechanism due to the frictional contact or clutch between the nut 82, arm 47, and the sleeve portion 85 of wheel 83. It will be appreciated that the movement of diaphragm 19, stem 28, coupling stem 34 and members 39, 44 and 47 over a considerable distance causes the valve plug 67 to be moved only a very small distance, e.g., a few thousandths of an inch. It is apparent that even if the motor mechanism and leverage mechanism move through their full paths of travel, the valve stem 70 will move through only a relatively small portion of its possible path of travel.

With the diaphragm motor control valve thus provided by this invention considerable improved control of the valve is obtained. Indeed, a diaphragm motor control valve such as described and illustrated herein has been used in a control service where two cubic feet per hour of hydrogen was throttled from 900 p.s.i.g. to atmospheric pressure. Adjustment of the valve through very small increments between its operative limits may be accomplished while the valve is on stream without preliminarily disassembling the leverage mechanism. This adjustment may be rapidly and accurately accomplished through a wider degree of adjustability than has been heretofore possible.

While specific embodiments have been shown for purposes of illustration, my invention is obviously not limited thereto and various modifications will become apparent to those skilled in the art and may be employed without departing from the scope of my invention. In particular, although the motor mechanism described and illustrated herein is the preferred embodiment, it is within the scope of this invention to employ any known motor mechanism having driving means which move in response to fluid pressure. Likewise, rather than the three-member leverage mechanism disclosed herein, the preferred embodiment, it is within the scope of this invention to employ, for example, a single pitman operatively coupled to the driven member of the motor mechanism and to the arm attached to the valve stem. While the downward movement of the coupling arm causes the valve to move toward its seat in the embodiment illustrated in the drawings, the valve can be caused to move away from its seat upon the downward movement of the coupling arm by mounting the fulcrum bracket on the opposite yoke arm and securing an intermediate portion of the first actuating arm thereto, as will be apparent to those skilled in the art upon being acquainted with this invention.

I claim:

1. A motor valve comprising in combination a valve body having a conduit for fluid flow therethrough, a valve seat in said conduit, a needle valve movable relative to said seat, a rotatable valve stem connected to said valve at one end and extending from said valve body, said valve stem being threadedly connected to said valve body, a motor comprising a supporting housing and a diaphragm housing secured thereto, said supporting housing secured to said valve body, a flexible diaphragm mounted in said diaphragm housing and responsive to pressure changes therein on one side of said diaphragm, a diaphragm follower plate for supporting said diaphragm on its other side, a motor stem connected to said plate and reciprocally disposed in said supporting housing, a spring urging said plate against said diaphragm, a leverage reduction train responsive to the reciprocal movement of said motor stem, one extremity of said train connected to said motor stem and the other extremity thereof adjustably and rotatably connected to said valve stem in such a manner that full travel of said train causes said valve to move only through a relatively small portion of its possible path of travel, a rotatable manual valve adjustment member secured to said valve stem and adapted to rotate and adjust the movable limits of said valve, and a locking member adapted to lock said train to said valve stem in any position of said adjustment.

2. A motor valve comprising in combination a valve body having a conduit for fluid flow therethrough, a valve seat in said conduit, a needle valve movable relative to said seat, a rotatable valve stem connected to said valve at one end and extending from said valve body, said valve stem being threadedly connected to said valve body, a motor comprising a housing secured to said valve body, said housing having a chamber, conduit means for supplying pressure to said chamber, a flexible diaphragm forming one wall of said chamber, a diaphragm follower plate for supporting said diaphragm on the opposite side from said chamber, a motor stem secured to said plate and centrally disposed in said housing, support means interiorly mounted in said housing, said support means having a central opening therein to permit the reciprocal movement of said motor stem therethrough, a spring urging said plate against said diaphragm, adjustable means carried by said support means for adjusting the tension of said spring, a leverage reduction train having first and second actuating arms and a linkage member connecting said arms, said first arm pivotally connected at one extremity to the interior of said housing and having an intermediate portion secured to the portion of said motor stem extending through said central opening, said second arm having one extremity adjustably and rotatably secured to said valve stem in such a manner that full travel of said train causes said valve to move only through a relatively small portion of its possible path of travel, a manual valve adjustment member secured to said valve stem and adapted to rotate and adjust the movable limits of said valve, and a locking member centrally mounted on said valve stem and adapted to lock said second arm to said valve stem in any position of said adjustment.

3. A motor valve comprising in combination a valve body having a conduit for fluid flow therethrough, a valve seat in said conduit, a needle valve movable relative to said seat, a rotatable valve stem connected to said valve at one end and extending from said valve body, said valve stem being threadedly connected to said valve body, a motor comprising a housing secured to said valve body, said housing having a chamber, conduit means for supplying pressure to said chamber, a flexible diaphragm forming one wall of said chamber, a diaphragm follower plate for supporting said diaphragm on the opposite side from said chamber, a motor stem secured to said plate and centrally disposed in said housing, support means interiorly mounted in said housing, said support means having a central opening therein to permit the reciprocal movement of said motor stem therethrough, a spring urging said plate against said diaphragm, adjustable means carried by said support means for adjusting the tension of said spring, a leverage reduction train having first and second actuating arms and a linkage member connecting said arms, said first arm pivotally connected at one extremity to a fulcrum bracket mounted on the interior of said housing and secured to a portion of said motor stem extending through said central member, said second arm having one extremity adjustably and rotatably secured to the extending portion of said valve stem in such a manner that full travel of said train causes said valve to move only through a relatively small portion of its possible path of travel, said train partially extending from said housing, a manual valve adjustment member secured to said valve stem and adapted to rotate and adjust the movable limits of said valve, and a locking member centrally mounted on said valve stem and adapted to lock said second arm to said valve stem in any position of said adjustment.

4. A motor valve comprising in combination a valve body having a conduit for fluid flow therethrough, a valve seat in said conduit, a needle valve movable relative to said seat, a rotatable valve stem connected to said valve at one end and extending from said valve body, said valve stem being threadedly connected to said valve body, a motor comprising a yoke surmounted by a diaphragm housing and secured thereto, said yoke having a bottom portion secured to said valve body, said housing having a chamber, conduit means for supplying pressure to said chamber, a flexible diaphragm rigidly secured at its outer marginal edges to said housing and forming one wall of said chamber, a diaphragm follower plate for supporting said diaphragm on the opposite side from said chamber, a motor stem centrally secured to said plate and extending within said yoke, support means interiorly mounted in said yoke, said support means having a threaded central opening therein, a bushing threaded in said central opening and having an opening to permit the reciprocal movement of said motor stem therethrough, a helical compression spring disposed axially of said central opening and adapted to urge said plate against said diaphragm, a leverage reduction train having first and second actuating arms and a linkage member connecting said arms, said first arm pivotally connected at one extremity to a fulcrum bracket mounted on the interior of said yoke and centrally secured to a portion of said motor stem extending through said bushing, said second arm having one enlarged extremity centrally and rotatably mounted on the extending portion of said valve stem in such a manner that full travel of said train causes said valve to move only through a relatively small portion of its possible path of travel, said train partially extending to the exterior of said yoke, a manual valve adjustment member secured to said valve stem and adapted to rotate and adjust the movable limits of said valve, and a locking member centrally mounted on said valve stem adapted to lock said second arm to said valve stem in any position of said adjustment.

References Cited in the file of this patent

UNITED STATES PATENTS

| | | |
|---|---|---|
| 379,824 | Sheldon | Mar. 20, 1888 |
| 927,422 | Moore | July 6, 1909 |
| 1,156,392 | Conrader | Oct. 12, 1915 |
| 1,425,412 | Norwood | Aug. 8, 1922 |
| 1,631,109 | Hizemann | May 31, 1927 |
| 1,644,717 | Ferrette | Oct. 11, 1927 |
| 2,564,569 | Goehring | Aug. 14, 1951 |

FOREIGN PATENTS

| | | |
|---|---|---|
| 8,914 | Great Britain | May 4, 1893 |